(12) United States Patent
Roszman (10) Patent No.: US 9,675,002 B2
(45) Date of Patent: Jun. 13, 2017

(54) SEED METER SYSTEM WITH SINGULATOR CONTROL

(71) Applicant: CNH Industrial America LLC, New Holland, PA (US)

(72) Inventor: Joshua J. Roszman, La Rue, OH (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/745,985

(22) Filed: Jun. 22, 2015

(65) Prior Publication Data
US 2016/0366814 A1 Dec. 22, 2016

(51) Int. Cl.
G06F 7/70 (2006.01)
A01C 7/10 (2006.01)
A01C 7/04 (2006.01)
A01C 19/02 (2006.01)

(52) U.S. Cl.
CPC ............. *A01C 7/105* (2013.01); *A01C 7/046* (2013.01); *A01C 19/02* (2013.01)

(58) Field of Classification Search
CPC ........... A01C 7/10; A01C 7/105; A01C 7/128; A01C 14/00; A01C 19/02; A01C 7/102; A01C 7/046; A01C 5/062
USPC ........... 701/50, 409; 111/200, 183, 184, 185
See application file for complete search history.

(56) References Cited

U.S. PATENT DOCUMENTS

| 5,848,571 | A | 12/1998 | Stufflebeam et al. |
| 6,070,539 | A | 6/2000 | Flamme et al. |
| 6,109,192 | A | 8/2000 | Foley et al. |
| 6,758,153 | B1 | 7/2004 | Hagen et al. |
| 7,377,221 | B1* | 5/2008 | Brockmeier ........... A01C 7/046 111/184 |
| 7,395,769 | B2 | 7/2008 | Jensen |
| 7,717,048 | B2 | 5/2010 | Peterson, Jr. et al. |
| 8,473,168 | B2* | 6/2013 | Goldman ............... A01C 7/046 111/200 |
| 2002/0170476 | A1* | 11/2002 | Bogner .................. A01C 7/046 111/183 |

(Continued)

OTHER PUBLICATIONS www.kinze.com/filesimages/Literature/4900.pdf; 4900 Planter; 2013 by KINZE Manufacturing, Inc., Williamsburg, Iowa; 17 pages.

*Primary Examiner* — Shardul Patel
(74) *Attorney, Agent, or Firm* — Rebecca L. Henkel; Rickard K. DeMille (57) ABSTRACT

A seed meter system with singulators that are automatically controlled while planting to reduce instances of skips and doubles, without requiring stopping for manual adjustment of singulators. This allows the seed meter system to automatically adjust the singulators to compensate for variations in rotational speed of seed disks of the seed meters, variations in vacuum pressure within the seed meters, and variations in the size(s) of seeds being planted to reduce instances of skips and doubles while planting. Adjustments to the singulator may be made reactively by identifying seed delivery discontinuities such as skips and doubles and then making correction adjustments to attenuate singulator-induced stimulus that may influence seed delivery discontinuities. Adjustments to the singulator may be made proactively by identifying changes in seed meter performance characteristics or environment that lead to delivery discontinuities such as skips and doubles and, thus, influence seed delivery rate.

20 Claims, 6 Drawing Sheets

(56) References Cited

U.S. PATENT DOCUMENTS

| | | | |
|---|---|---|---|
| 2003/0009282 A1* | 1/2003 | Upadhyaya | A01B 79/005 701/409 |
| 2005/0204972 A1* | 9/2005 | Eben | A01C 7/046 111/185 |
| 2007/0266917 A1* | 11/2007 | Riewerts | A01C 7/046 111/200 |
| 2008/0110383 A1* | 5/2008 | Friestad | A01C 7/046 111/185 |
| 2012/0067262 A1 | 3/2012 | Wilhelmi et al. | |
| 2012/0265410 A1* | 10/2012 | Graham | A01B 79/005 701/50 |
| 2014/0261118 A1* | 9/2014 | Mayerle | A01C 7/102 111/184 |

* cited by examiner

SEED METER SYSTEM WITH SINGULATOR CONTROL

FIELD OF THE INVENTION

The invention relates generally to row-crop planters or seeders and, in particular, to singulators of planter seed meters.

BACKGROUND OF THE INVENTION

Modern farming practices strive to minimize operating expenses. Efforts have been made to reduce operating expenses by increasing the versatility of implements to allow the implements to apply different products at different times by switching the implement setup(s). Planter seed meters can be converted to plant different seed types during different planting sessions by changing their internal seed disks to accommodate different sizes and shapes of the different seed types. Another way of reducing operating expenses is to operate the implements at relatively faster speeds, which reduces the amount of operating time to complete certain tasks. When operating implements at faster speeds, it can be important to maintain the quality of operation that can be achieved while operating at relatively slower operating speeds. This can be especially difficult to accomplish during planting operations that benefit from precise seed spacing accuracy in order to maintain a good seed environment. Brush-type and spool-type singulators are known for improving seed spacing accuracy by removing extra seeds from seed pockets of planter seed meter seed disks. Some such singulators are manually adjustable to accommodate different singulating performance for different seed types. However, typical singulators have only one or two settings per seed type and thus limited adjustability for singulating seeds of certain seed types, especially those that can vary substantially in their sizes, shapes, and other characteristics. This can lead to seed release anomalies from the seed meters, like skips during which a seed pocket of the seed disk is empty and therefore releases no seed when it should release one seed and doubles during which a seed pocket of the seed disk has more than one seed and therefore releases more than one seed when it should release only one.

SUMMARY OF THE INVENTION

The present invention is directed to a seed meter system with singulators that are automatically controlled while planting to reduce instances of skips and doubles, without requiring stopping for manual adjustment of singulators. This allows the seed meter system to automatically adjust the singulators to compensate for variations in rotational speed of seed disks of the seed meters, variations in vacuum pressure within the seed meters, and variations in the size(s) of seeds being planted to reduce instances of skips and doubles while planting.

Adjustments to the singulator may be made reactively by identifying seed delivery discontinuities such as skips and doubles and then making correction adjustments to attenuate singulator-induced stimulus that may influence seed delivery discontinuities. Adjustments to the singulator may be made proactively by identifying changes in seed meter performance characteristics or environment that lead to delivery discontinuities such as skips and doubles and thus influence seed delivery rate. Making proactive adjustments to the singulators when changes in seed meter performance characteristics are identified helps prevent at least some instances of skips and doubles that would have occurred due to the changes in seed meter performance and/or helps reduce the magnitude of correction(s) that are needed, reducing the amount of time that the delivery rate is outside of an acceptable range.

According to one aspect of the invention, a control system is used for adjusting seed singulation in a seed meter system of a planter while row-crop planting includes conveying seeds through a seed meter with a seed disk for delivering the seeds onto an agricultural field during a row-crop planting session with a planter. The seeds are singulated with a singulator during conveyance through the seed meter for individual release out of the seed meter. A current singulator setting of the singulator corresponding to a current position of the singulator inside of the seed meter is detected by the control system, along with a current singulation rate. A target singulation rate is determined and a deviation of the current singulation rate with respect to the target singulation rate is identified by the control system. The control system determines a target-corrected singulator setting corresponding to a target-corrected position of the singulator inside of the seed meter based on the identified deviation of the current singulation rate with respect to the target singulation rate. The control system adjusts the singulator from the current singulator setting to the target-corrected singulator setting to move the singulator from the current position target-corrected position inside the seed meter.

According to another aspect of the invention, the control system receives signals from each of a singulator setting sensor arranged in the seed meter to detect the current singulator setting and a singulation sensor arranged in the seed meter to detect the current singulation rate. While identifying the deviation of the current singulation rate with respect to the target singulation rate, the control system evaluates data based on the signal from the singulation sensor relative to the target singulation to determine a current deviation value. The control system compares the current deviation value to a threshold deviation value to determine whether to adjust the singulator.

According to another aspect of the invention, the control system monitors performance characteristic of the seed meter, including at least one of a rotational speed of the seed disk, a vacuum pressure inside of the meter housing, and a travel speed of the seed meter relative to the agricultural field. The control system detects a change in the performance characteristic of the seed meter and makes a preemptive correction adjustment to the singulator based on the detected change in the performance characteristic of the seed meter.

According to another aspect of the invention, a seed meter system is provided for dispensing individual seeds while row-crop planting an agricultural field with a planter. The seed meter system includes a housing defining a housing cavity. A seed reservoir is defined within the housing cavity configured for receiving seeds. The housing has an outlet for directing seeds out of the housing toward an agricultural field, for example, through a seed tube. A seed disk is arranged for rotation within the housing cavity and has seed pockets rotating past the seed reservoir and configured to receive seeds from the seed reservoir and carry the seeds toward the outlet of the housing. A singulator is arranged within the housing cavity along a movement path of the seed pockets between the seed reservoir and the outlet. The singulator includes a seed-removing assembly arranged for movement with respect to the seed pockets to apply mechanical interaction to the seeds in the seed pockets for removing excess seeds from the seed pockets. An adjustment drive system is arranged for moving the seed-removing assembly to increase or decrease an amount of mechanical interaction applied by the seed-removing assembly to the seeds in the seed pockets. A control system is configured to monitor seed delivery out of the seed meter and control the adjustment drive system. Controlling the adjustment drive system allows for making correction adjustments by moving the seed-removing assembly to increase or decrease an amount of mechanical interaction applied by the seed-removing assembly to the seeds in the seed pockets based on the monitor seed delivery. This facilitates making correction adjustments to correct seed delivery discontinuities.

According to another aspect of the invention, the control system controls the adjustment drive system to move the seed-removing assembly to a base position within the housing cavity during preparation for beginning the planting session. Then, during the planting session, the control system commands movement of the seed-removing assembly away from the base position in response to detection of seed delivery discontinuities.

According to another aspect of the invention, at least one seed sensor is arranged downstream of the singulator and configured to send a signal to the control system corresponding to seed delivery rate. The control system evaluates the signal to identify an under-singulation condition in which the seed-removing assembly applies too little mechanical interaction to the seeds in the seed pockets allowing more than one seed to be carried in individual seed pockets or an over-singulation condition in which the seed-removing assembly applies too much mechanical interaction to the seeds in the seed pockets allowing emptying all seeds from individual seed. The control system controls the adjustment drive system to move the seed-removing assembly to attenuate the under-singulation condition or over-singulation condition.

According to another aspect the invention, the control system is configured to control the adjustment drive system to move the seed-removing assembly to a base position within the housing cavity based at least in part on a seed type defined through the control system.

According to another aspect of the invention, the seed-removing assembly may be a brush-type and/or spool-type. Spool-type seed-removing assemblies include at least one spool configured for removing excess seeds from the seed pockets. A first spool and a second spool may be arranged along a travel path of seed pockets, arranged on radial opposite sides of the seed pockets. First and second spools may be arranged radially outward of the seed pockets and a third spool may be arranged on the opposite side of the seed pockets, radially inward of the seed pockets.

According to another aspect of the invention, a method of adjusting seed singulation in a seed meter system of a planter while row-crop planting includes defining a seed type for planting onto an agricultural field during a planting session with the planter. A seed meter within the seed meter system includes a seed disk having seed pockets carrying the seeds to a release location in the seed meter for release into a seed tube delivering the seeds onto the field. A singulator of each seed meter is configured to remove potential extra seeds from the seed pockets for leaving a single seed in each seed pocket of the seed disk. A preliminary adjustment is made to the singulators of the seed meters for controlling how much mechanical interaction the singulators apply to the seeds in the seed pockets for removing potential extra seeds from the seed pockets of the seed disks based at least in part on the defined seed type;

Seed delivery rates of the seed meters are monitored during the planting session. A seed meter having a seed delivery rate discontinuity is identified and a correction adjustment is made to the singulator in the seed meter with the identified seed delivery rate discontinuity. The adjustment changes how much mechanical interaction the singulator applies to the seeds in the seed pockets based on the identified seed delivery rate discontinuity.

According to another aspect of the invention, the control system commands the adjustment drive system to move the seed-removing assembly between a maximum singulating position applying a maximum amount of mechanical interaction to the seeds in the seed pockets and a minimum singulating position applying a minimum amount of mechanical interaction to the seeds in the seed pockets.

According to another aspect of the invention, the preliminary adjustment to the singulators includes calibrating each singulator by moving the seed-removing assembly from a relatively more aggressive singulating position to a relatively less aggressive singulating position to automatically determine a threshold at which a seed can travel through the singulator to establish a base position for the singulator before planting and from which adjustments will be made during planting. This may include moving the seed-removing assembly from a first position relatively closer to a maximum singulating position creating a purposeful over-singulation condition in which the seed-removing assembly empties all seeds from individual seed pockets toward a second position relatively closer to the minimum singulating position while priming the seed meter. This gradually reduces the amount of mechanical interaction applied by the seed-removing assembly to the seeds in the seed pockets while priming the seed meter. When the singulator achieves a position with its seed-removing assembly open or loose enough to allow seeds to remain in the seed pockets while passing through the singulator, movement of the seed-removing assembly is stopped. At this point, a base position of the seed-removing assembly is defined that will be maintained at the beginning of the planting session and from which the singulator will be adjusted while planting, if seed delivery discontinuities are detected by the control system.

According to another aspect of the invention, a seed type that will be planted is defined by entering seed type information into the control system. During the preliminary adjustment, the control system commands an adjustment drive system of the singulator to move the seed-removing assembly within the seed meter to a base position corresponding to a predetermined base setting for the defined seed type.

According to another aspect of the invention, a seed delivery rate discontinuity is identified. A seed delivery rate discontinuity may correspond to an under-singulation condition of the singulator in which a seed-removing assembly applies too little mechanical interaction to the seeds in the seed pockets allowing more than one seed to be carried in individual seed pockets or an over-singulation condition of the singulator in which the seed-removing assembly applies too much mechanical interaction to the seeds in the seed pockets allowing emptying all seeds from individual seed pockets. The control system may command movement of the seed-removing assembly to attenuate the under-singulation condition or over-singulation condition of the singulator as a correction adjustment to the singulator.

According to another aspect of the invention, the correction adjustment may include implementing a correction strategy determined based at least in part on the defined seed type. The correction strategy may include making relatively larger correction adjustments for relatively larger seed types and making relatively smaller correction adjustments for relatively smaller seed types.

According to another aspect of the invention, an adjustment drive system is arranged for moving the seed-removing assembly and the control system sends a correction adjustment signal to the adjustment drive system commanding movement of the seed-removing assembly during the correction adjustment. The adjustment drive system may include a motor, and the correction adjustment signal from the control system may command rotation of an output shaft of the motor in a direction and an angular distance corresponding to performing a correction of the under-singulation or over-singulation condition of the singulator during the correction adjustment. The adjustment drive system may include a linear actuator and the correction adjustment signal from the control system may command extension or retraction of the linear actuator in a direction and distance corresponding to performing a correction of the under-singulation or over-singulation condition of the singulator during the correction adjustment. The seed-removing assembly may include at least one spool and the control system commands movement of the at least one spool relatively nearer to or farther from the seed pockets during the correction adjustment until the spool arrives at an adjusted position. The at least one spool of the seed-removing assembly may include a first spool and a second spool arranged on radial opposite sides of the seed pockets of the seed disk. The control system may command movement of the first and second spools in opposite directions toward each other to move the first and second spools closer to the seed pockets to attenuate under-singulation conditions of the singulator or in opposite directions away from each other to move the first and second spools farther from the seed pockets to attenuate over-singulation conditions of the singulator.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

Figure 1:
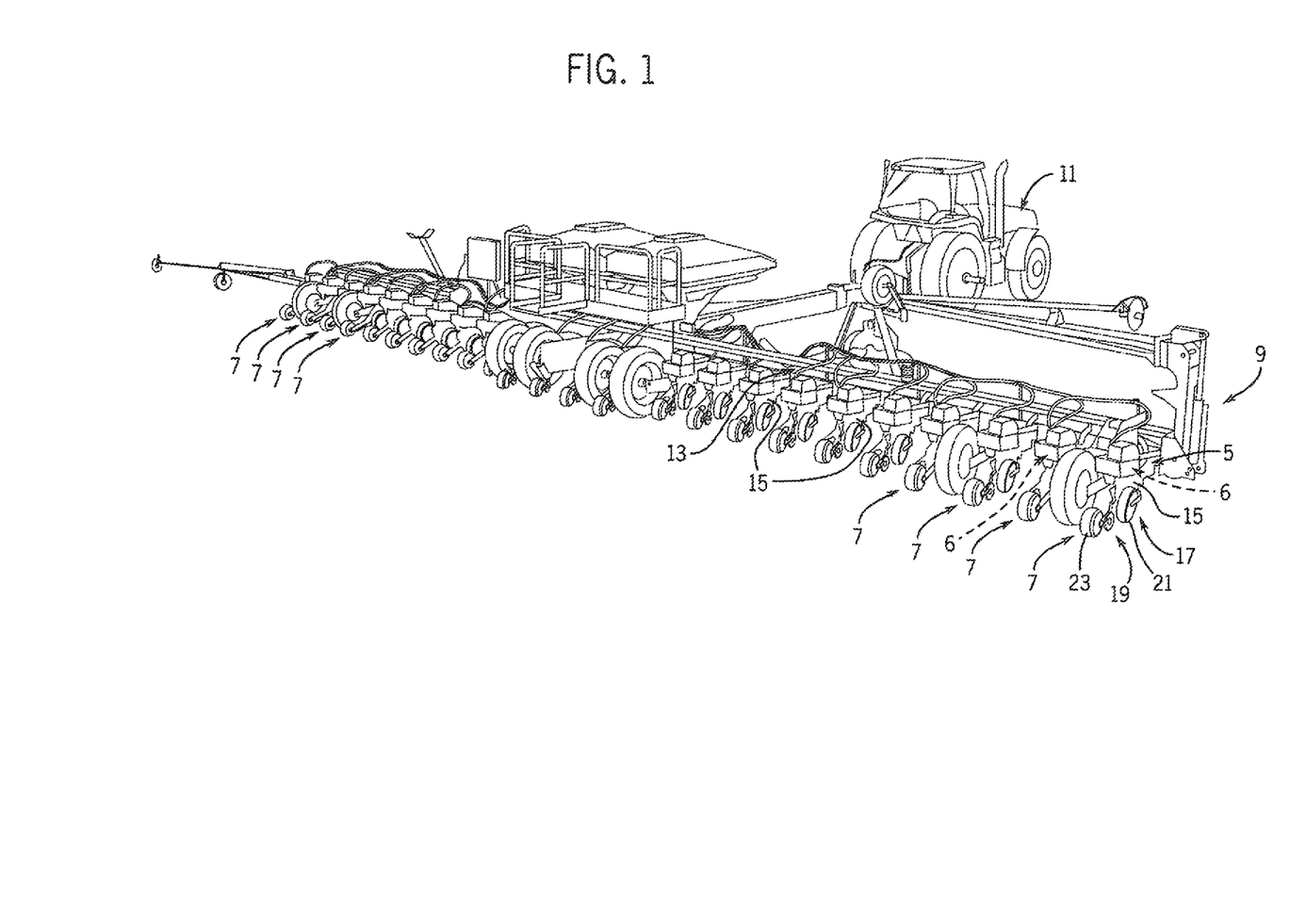
FIG. 1 illustrates a pictorial view of a planter incorporating a seed meter system in accordance with the present invention.
Figure 2:
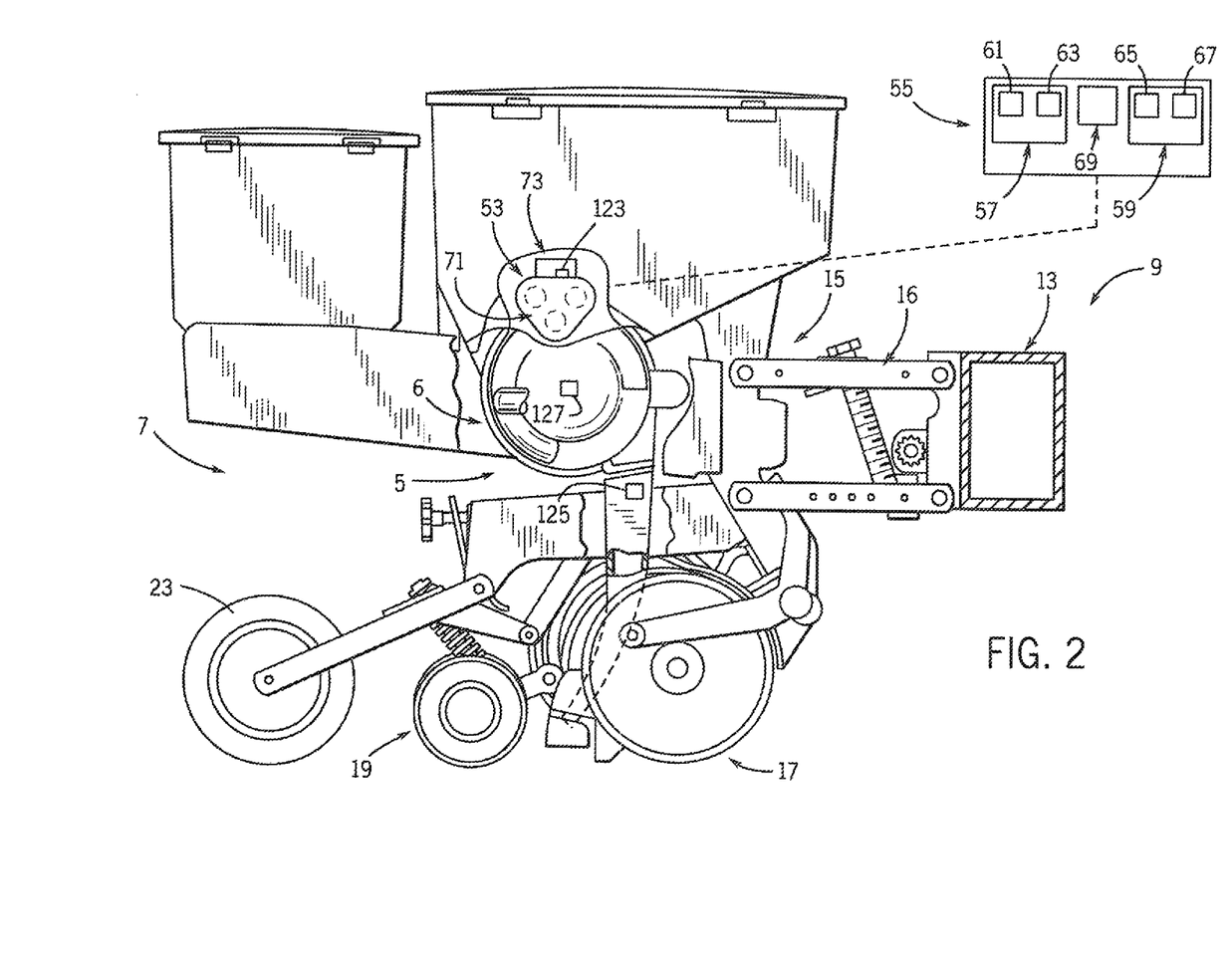
FIG. 2 illustrates a simplified side elevation view a row unit of the seed meter system shown in FIG. 1.

Referring now to the drawings and specifically to FIG. 1 a seed meter system 5 of row units 7 of a planter 9 is configured for automatic singulation adjustment while delivery seeds from seed meters 6 to reduce seed delivery anomalies or discontinuities such as skips and doubles for enhancing seed delivery rate consistency. Planter 9 may be one of the EARLY RISER® series planters available from Case IH and is typically pulled by a tractor 11. The planter 9 has a frame 13 that supports the multiple row units 7 that are substantially identical. Each row unit 7 includes a respective seed meter 6 and various support components for supporting the seed meter 6 and corresponding ground-engaging components. The planter 9 shown in FIG. 1 is configured to central bulk storage of seeds in bulk fill tanks, with the row units 7 pneumatically receiving the seeds from the bulk fill tanks, for example, into mini-hoppers that feed the seed meters 6. FIG. 2 shows a row unit 7 of a planter 9 configured for on-row bulk storage with on-row bulk storage compartments that gravity feed the seeds from bulk storage directly into the seed meters 6.

Referring again to FIG. 1, such support components include a sub-frame 15 that is connected to the frame 13 of the planter 9 by way of a parallel linkage system 16 (FIG. 2) and supports the seed meter 6 and furrow opening 17 and closing mechanisms 19 toward front and back ends of the row unit 7. The opening and closing mechanisms 17, 19 may include opener disks and closing disks, respectively, or other ground-engaging tools for opening and closing a furrow. Each row unit 7 may include a gauge wheel 21 configured for adjusting furrow depth by limiting soil penetration of the furrow-opening mechanism 17 while creating a furrow, and a press wheel 23 may be arranged to roll over the closed furrow to firm the soil over the seed to further close the furrow and promote favorable seed-to-soil contact.

Figure 3:
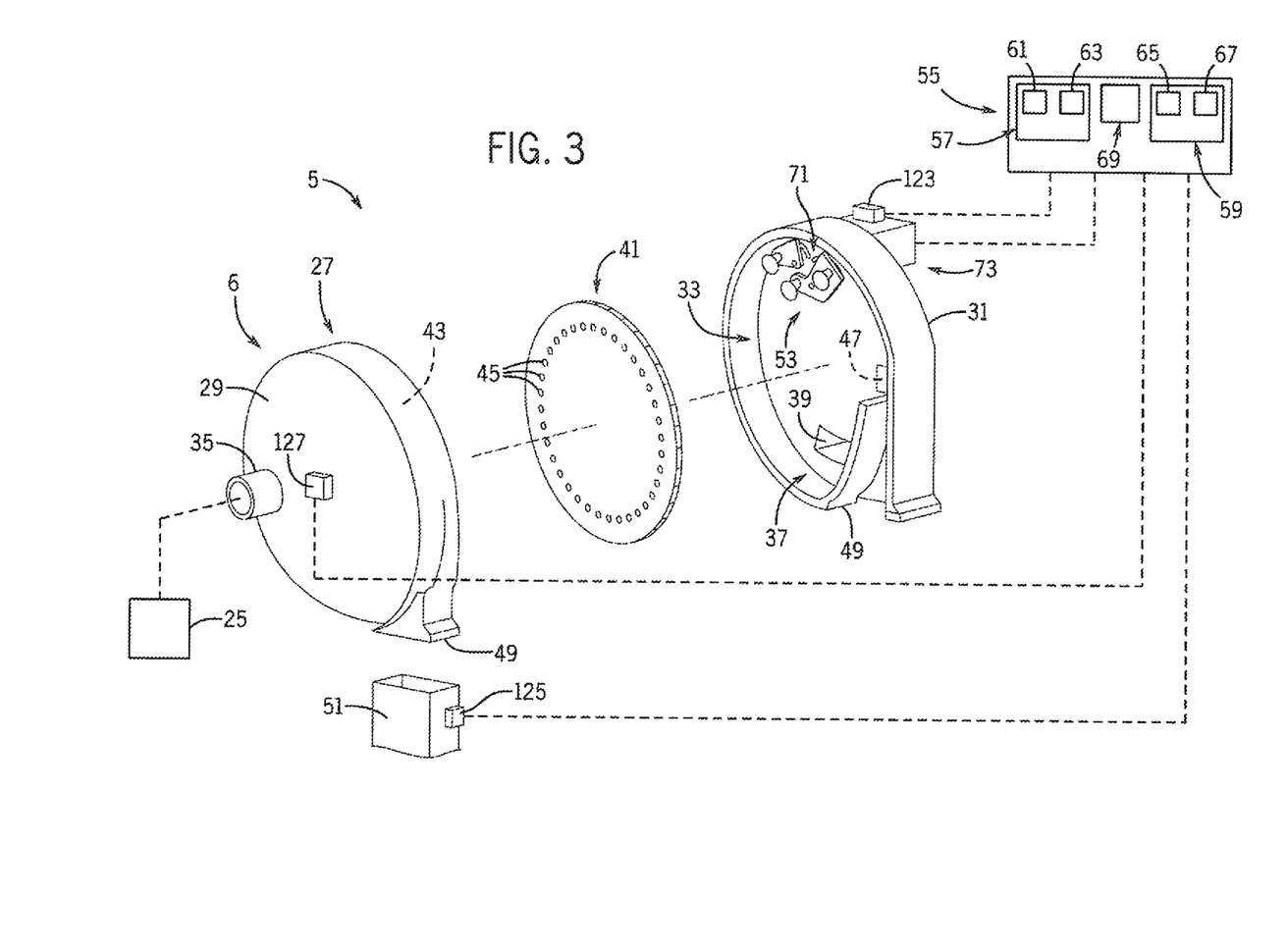
FIG. 3 illustrates a partially schematic exploded pictorial view of a seed meter of the seed meter system of FIG. 1

Referring now to FIG. 3, the seed meter 6 is shown as a vacuum seed meter operably connected to an airflow system 25 that may include a positive air pressure source and a vacuum source for establishing positive and vacuum pressures and corresponding air flows for delivery seed to the seed meter(s) 6 for central bulk storage of seeds (FIG. 1) and for moving the seeds through the seed meter(s) 6. The positive air pressure source and vacuum sources can be known pumps, fans, blowers, and/or other known airflow system components. Each seed meter 6 has a multi-component housing 27 with side covers 29, 31 that surround a housing cavity 33. Side cover 29 has a vacuum inlet 35 that attaches the housing 27 to the airflow system 25 for exposing the housing cavity 33 to vacuum pressure that pulls air out of the housing cavity 33 through the vacuum inlet 35. A seed reservoir 37 is defined within the housing cavity 33 and is configured for receiving seeds through an inlet 39 and temporarily holding the seed that is being metered. A seed disk 41 is arranged for rotation in housing cavity 33, between the seed reservoir 37 and a vacuum chamber 43. The seed disk 41 has holes or seed pockets 45 that rotate past the seed reservoir 37 and receive and hold seeds by vacuum pressure in the seed pockets 45 and rotation the seeds through the housing cavity 33 to a release location 47 in the housing cavity 33. At the release location 47, vacuum pressure is cut off from the seed disk 41 and each seed drops from its respective seed pocket 45 through an outlet 49 of the housing 27 and a seed tube 51 connected to the outlet 49 that delivers the seed onto an agricultural field.

Referring now to FIGS. 2 and 3, at each seed meter 6, while moving through the housing cavity 33, excess seeds from the seed pockets 45 are removed with a singulator 53 so that only a single seed is carried in each of the seed pockets 45 for release at the release location 47. The singulators 53 of the seed meters 6 are automatically controlled with a control system 55 while planting to reduce instances of seed release anomalies or seed delivery rate discontinuities, as explained in greater detail elsewhere herein. Control system 55 includes a planter controller 57 and a tractor controller 59 that operably communicate with each other, for example, by way of an ISOBUS connection, for coordinating controls of seed meter system 5 such as the seed meters 6 and other components of the planter 9 and tractor 11 (FIG. 1). The planter controller 57 is shown including a controller 61 and a power supply 63. The controller 61 of the planter controller 57 can include an industrial computer or, e.g., a programmable logic controller (PLC), along with corresponding software and suitable memory for storing such software and hardware including interconnecting conductors for power and signal transmission for controlling electronic, electro-mechanical, and hydraulic components of the seed meter system 5 and other components of the planter 9. The tractor controller 59 is configured for controlling operations of the tractor 11 such as controlling steering, speed, braking, shifting, and other operations of the tractor 11. The tractor controller 59 is shown as including a controller 65 and power supply 67. The tractor controller 59 is configured for controlling the functions of the tractor 11 by controlling the various GPS steering, transmission, engine, hydraulic, and/or other systems of the tractor 11. Like the controller 61 of the planter controller 57, the controller 65 of the tractor controller 59 can include an industrial computer or, e.g., a programmable logic controller, along with corresponding software and suitable memory for storing such software and hardware including interconnecting conductors for power and signal transmission for controlling electronic, electro-mechanical, and hydraulic components of the tractor 11. An interface system 69 is operably connected to the planter and/or tractor controller 57, 59 and includes a monitor and various input devices to allow an operator to see the statuses and control various operations of the tractor 11 from within the cab of the tractor 11. The interface system 69 may be a MultiControl Armrest™ console available for use with the Maxxum™ series tractors from Case IH and/or an AFS Pro 700 display incorporating an AccuStat system, available from Case IH.

Still retelling to FIGS. 2 and 3, each singulator 53 includes a seed-removing assembly 71 and an adjustment drive system 73. The seed-removing assembly 71 is configured to singulate seeds in the seed pockets 45 by removing excess seeds and leaving only one seed per seed pocket 45. The adjustment drive system 73 is configured to adjust the singulator 53 as controlled by control system 55 to move the seed-removing assembly 71 to vary the amount of mechanical interaction between the seed-removing assembly 71 and seeds in the seed disk 41 that are rotating through the housing cavity 33.

Figure 4:
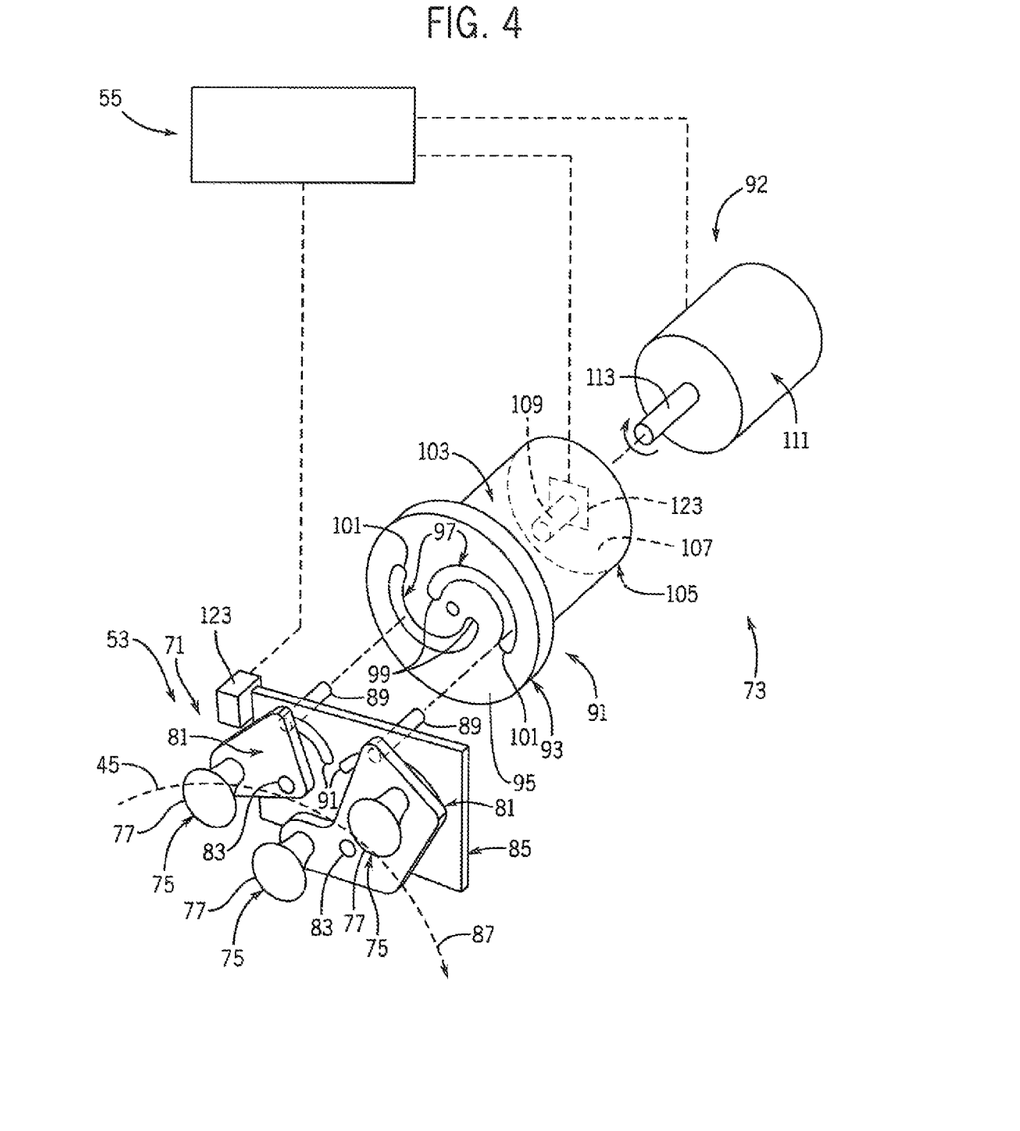
FIG. 4 illustrates a partially schematic exploded pictorial view of a singulator of the seed meter system of FIG. 1.
Figure 5:
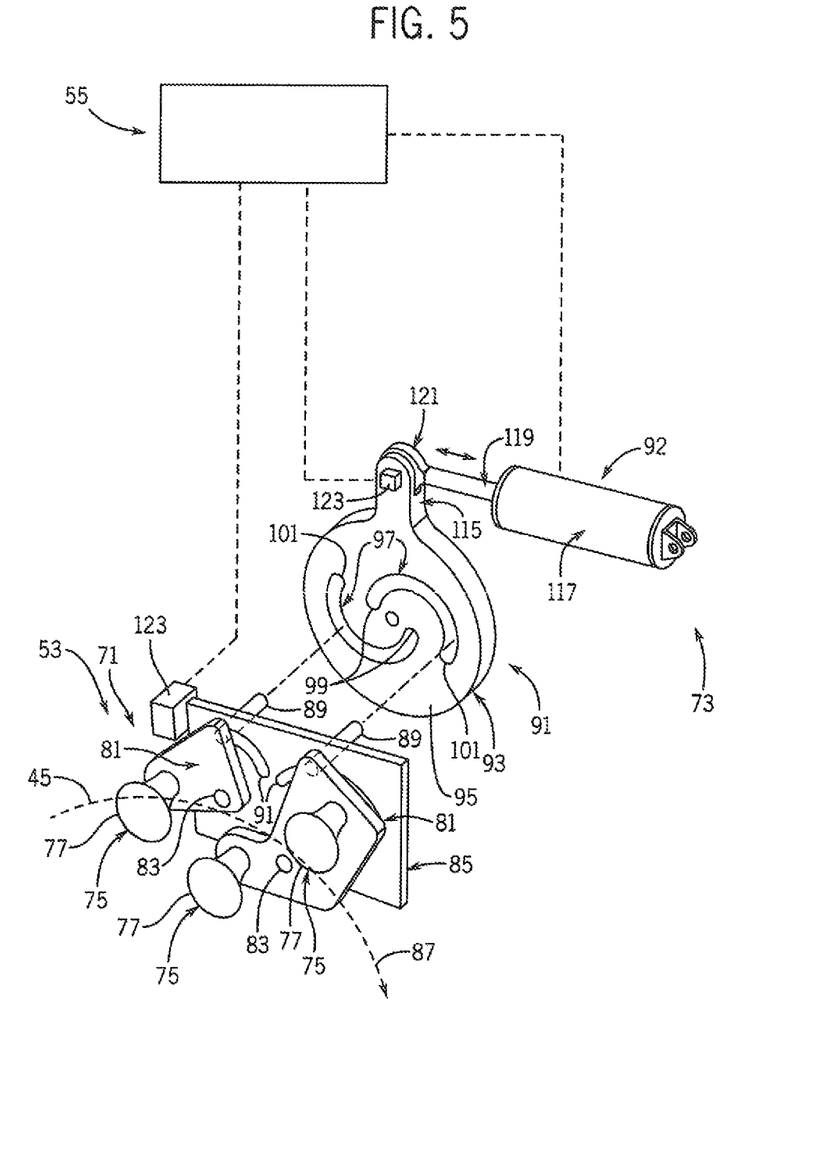
FIG. 5 illustrates a partially schematic exploded pictorial view of a variant of the singulator of FIG.

Referring now to FIGS. 4 and 5, seed-removing assembly 71 of these embodiments includes at least one spool 75, shown here as having three spools 75. Each spool 75 has an outer face 77 and a neck 79 that extends from the face 77 to a pivot arm 81 that pivots about a pivot pin 83 connected to a supporting plate 85 that is connected to the side cover 31 (FIG. 3) of the seed meter 6 (FIG. 3) to hold the seed-removing assembly 71 with the spool outer faces 77 engaging an outer surface of the seed disk 41 (FIG. 3). The singulator 53 is arranged within the housing cavity 33 (FIG. 3) along a movement path of the seed pockets 45 between the seed reservoir 37 and the outlet 49, as represented by the dashed line curved arrow 87 with the seed pockets 45 schematically represented by the dashed line segments of the curved arrow 87. In this way, seeds in the seed pockets 45 are forced to travel between the two outer spools 75 and the one inner spool 75, whereby respective spools 75 are arranged on radial opposite sides of the seed pockets 45 relative to seed disk surface engaged by the spools 75. This allows the spools 75 to remove potentially excess seeds that hang radially inward and/or radially outward from the seed pockets 45. A relative amount of tightness or aggressiveness and looseness or less aggressiveness of the singulating or seed removing action of the seed-removing assembly 71 is varied by moving the relative positions of the spools 75 with respect to the movement path of the seed pocket movement path 87.

Still referring to FIGS. 4 and 5, moving the spools 75 closer to the seed pocket movement path 87 increases the mechanical interaction between the seed-removing assembly 71 and the seeds in the seed pockets 45, increasing the singulation activity or making the singulation more aggressive. This corresponds to adjusting the singulator 53 to a relatively more aggressive setting. Moving the spools 75 farther from the seed pocket movement path 87 decreases the mechanical interaction between the seed-removing assembly 71 and the seeds in the seed pockets 45, decreasing the singulation activity or making the singulation less aggressive. This corresponds to adjusting the singulator 53 to a relatively less aggressive setting. Adjusting the setting of the singulator 53 is done by rotating the pivot arms 81 about the pivot pins 83 by moving arm pins 89 that extend from back surfaces of the pivoting arms 81 and through curved slots 91 extending through the supporting plate 85. Referring to the pivot, arm that supports a single spool 75, shown toward the left-hand side, by pushing the arm pin 89 to the left, as illustrated, provides a counterclockwise rotation of the left-hand pivot arm 81, which moves the spool 75 downwardly and closer to the seed pocket movement path 87 for a more aggressive setting of the singulator 53. Still referring to the pivot arm shown toward the left-hand side, by pushing the arm pin 89 to the right, as illustrated, provides a clockwise rotation of the left-hand pivot arm 81, which moves the spool 75 upwardly and farther from the seed pocket movement path 87 for a less aggressive setting of the singulator 53. Referring to the pivot arm that supports two spools 75, shown toward the right-hand side, by pushing the arm pin 89 to the right, as illustrated, provides a clockwise rotation of the right-hand pivot arm 81, which moves the upper spool 75 downwardly and the lower spool upwardly, both closer to the seed pocket movement path 87 for a more aggressive setting of the singulator 53. Still referring to the pivot arm shown toward the right-hand side, by pushing the arm pin 89 to the left, as illustrated, provides a counterclockwise rotation of the right-hand pivot arm 81, which moves the upper spool 75 upwardly and the lower spool downwardly, both farther from the seed pocket movement path 87 for a less aggressive setting of the singulator 53.

Still referring to FIGS. 4 and 5, a hub 91 is driven into rotation by an actuator 92 for moving the arm pins 89 to adjust positions of the spool 75 and correspondingly the setting of the singulator 53. Flub 91 has an end 93 with a face 95 that has grooves 97 extending into the face 95 that are actuate inner ends 99 spaced closer to each other and to a middle portion of the face 95 and outer ends 101 spaced farther from each other and closer to the outer perimeter of the face 95. The grooves 97 receive the arm pins 89 so that rotation of the hub 91 in a first direction pushes the arm pins 89 away from each other, moving the spools 75 closer to the seed pocket movement path 87 for a more aggressive setting of the singulator 53. Rotation of the hub 91 in a second, opposite direction pushes the arm pins 89 toward each other, moving the spools 75 farther from the seed pocket movement path 87 for a less aggressive setting of the singulator 53. The hub 91 may further include a dial (not shown) accessible from outside of the meter housing 27 for manual adjustment of the setting of the singulator 53.

Referring now to FIG. 4, the hub 91 includes a collar 103 extending away from the end 93 and defining an opposite end 105 with the face 107 into which a blind bore 109 extends. In this embodiment, the actuator 92 is a rotary actuator, shown as a motor 111 with an output shaft 113 that is received into the bore 109 and locked into rotation unison by way of for example, splines or a keyed arrangement, allowing rotation of the output shaft 113 to be translated into rotation of the hub 91. Referring now to FIG. 5, the hub 91 includes a tab 115 extending radially away from an outer circumferential surface of the hub 91. In this embodiment, the actuator 92 is a linear actuator, shown as a ram or cylinder 117 which may be hydraulic or pneumatic cylinder with an extendable and retractable piston 119 with an end 121 connected to the tab 115, allowing extension and retraction of the piston 119 to be translated into rotation of the hub 91.

Referring again to FIGS. 4 and 5, sensors such as singulator setting sensor 123, singulation sensor 125, and seed meter sensor 127 are arranged in the seed meter system 5 and operatively connected to the control system 55. This allows the control system 55 to reactively and/or proactively control the singulator 53 to automatically compensate for variations in rotational speed of seed disks 41 of the seed meters 6, variations in vacuum pressure within the seed meters 6, and variations in the size(s) of seeds being planted to reduce instances of skips and doubles from the seed meters 6 while planting. The singulator setting sensors 123, singulation sensors 125, and seed meter sensors 127 (FIG. 2) may be any of a variety of suitable sensors, depending on what is being is being detected, including at least one of a potentiometer, hall-effect sensor, infrared sensor, ultrasonic sensor, light sensor, and vacuum and/or other pressure sensor. The singulator setting sensors 123 may be positions sensors such as potentiometers or hall-effect sensors that are arranged in the seed meter 6 (FIGS. 2 and 3) to detect a current singulator setting and corresponding position and/or movement of the spool(s) 75 and/or pivot arm 81. The singulation sensors 125 can be seed sensors such as infrared seed sensors arranged in the seed tubes 51 that can detect seeds traveling past the singulation sensors 125. The seed meter sensors 127 (FIG. 2) can be speed or rotational sensors arranged in the seed meters 6 to detect rotational speed of the seed disks 41, vacuum and/or pressure sensors arranged in the seed meters 6 to detect the pressure inside the meter housing 27, or seed sensors arranged inside of the meter housing 27 for detecting the presence of seeds inside of the seed pockets 45 while the seed disk 41 rotates through the meter housing 27.

Referring again to FIGS. 2 and 3, during use, the control system 55 automatically makes adjustments to the singulator 53 reactively by identifying seed delivery discontinuities such as skips and doubles based on signals from the singulation sensors 125 and then making corrective adjustments to the singulator 53 to reduce the occurrences of skips or doubles, which may be done along with automatic adjustments of other settings of seed meter(s) 6, such as vacuum pressure setting(s), to attenuate seed release discontinuities. When over-singulation is detected, the control system 55 adjusts the singulator 53 to a less aggressive singulating setting and when under-singulation is detected, the control system 55 adjusts the singulator 53 to a more aggressive singulating setting. In one embodiment, the control system 55 can determine a current singulator setting based on signals from the singulator setting sensors 123 and determine a current singulation rate based on signals from the singulation sensors 125. The control system 55 determines a target singulation rate and a deviation of the current singulation rate with respect to the target singulation rate. For example, the target singulation rate can be predetermined such as by programming into the control system 55. Based on the identified deviation of the current singulation rate with respect to the target singulation rate, the control system 55 determines a target-corrected singulator setting. The control system 55 adjusts the singulator 53 from the current singulator setting to the target-corrected singulator setting to move the singulator from the current position to a target-corrected position inside the seed meter, and the singulation rate is again determined and evaluated with respect to the target singulation rate. Control system 55 may simultaneously control the airflow system 25 to vary the magnitude of vacuum pressure inside the seed meter 6 to attenuate seed delivery discontinuities. Planter controller 57 of control system 55 may refer to a lookup table or other stored values of suitable internal vacuum pressures for the seed meter 6 corresponding to the operating conditions of the seed meter 6 for making adjustment decisions. Detected skips, along with detected relatively low or sub-threshold vacuum pressures, may indicate that seeds are falling off the seed disk 41 before reaching the release location 47, whereas detected skips, along with detected relatively high or above-threshold vacuum pressures, may indicate that seeds are being held too tightly against the seed disk 41, preventing their release at the release location 47. Control system 55 can control the airflow system 25 to increase or decrease vacuum pressure at vacuum inlet 35 and thus inside seed disk 6 to improve seed release rate consistency, which may be done in a coordinated effort with adjustments to singulator 53. In one embodiment, the target singulation rate is one hundred percent singulation and the control system 55 continuously seeks the 100 percent target singulation rate by adjusting the singulator 53. In one embodiment, the control system 55 defines a threshold deviation value from the target singulation rate below which the control system 55 adjusts the singulator 53. The threshold deviation value can be predetermined such as by programming into the control system 55. In one embodiment, the threshold deviation value is two percent, whereby the control system 55 commands adjustment of the singulator 53 if the detected singulation rate falls below ninety-eight percent. The control system 55 may command proactive adjustments to the singulator 53 by identifying changes in performance characteristics or environment of the seed meter 6 that could lead to delivery discontinuities such as skips and doubles and thus influence seed delivery rate. In one embodiment, the control system 55 monitors performance characteristic of the seed meter 6, including at least one of a rotational speed of the seed disk 41 and/or a vacuum pressure inside of the meter housing 27 based on signals from the seed meter sensor 127 and a travel speed of the seed meter 6 relative to the agricultural field based on signals from a speed sensor(s) at the planter 9 or tractor 11. The control system 55 detects a change in the performance characteristic of the seed meter 6 and makes a preemptive correction adjustment to the singulator 53 based on the detected change in the performance characteristic of the seed meter 6.

Figure 6:
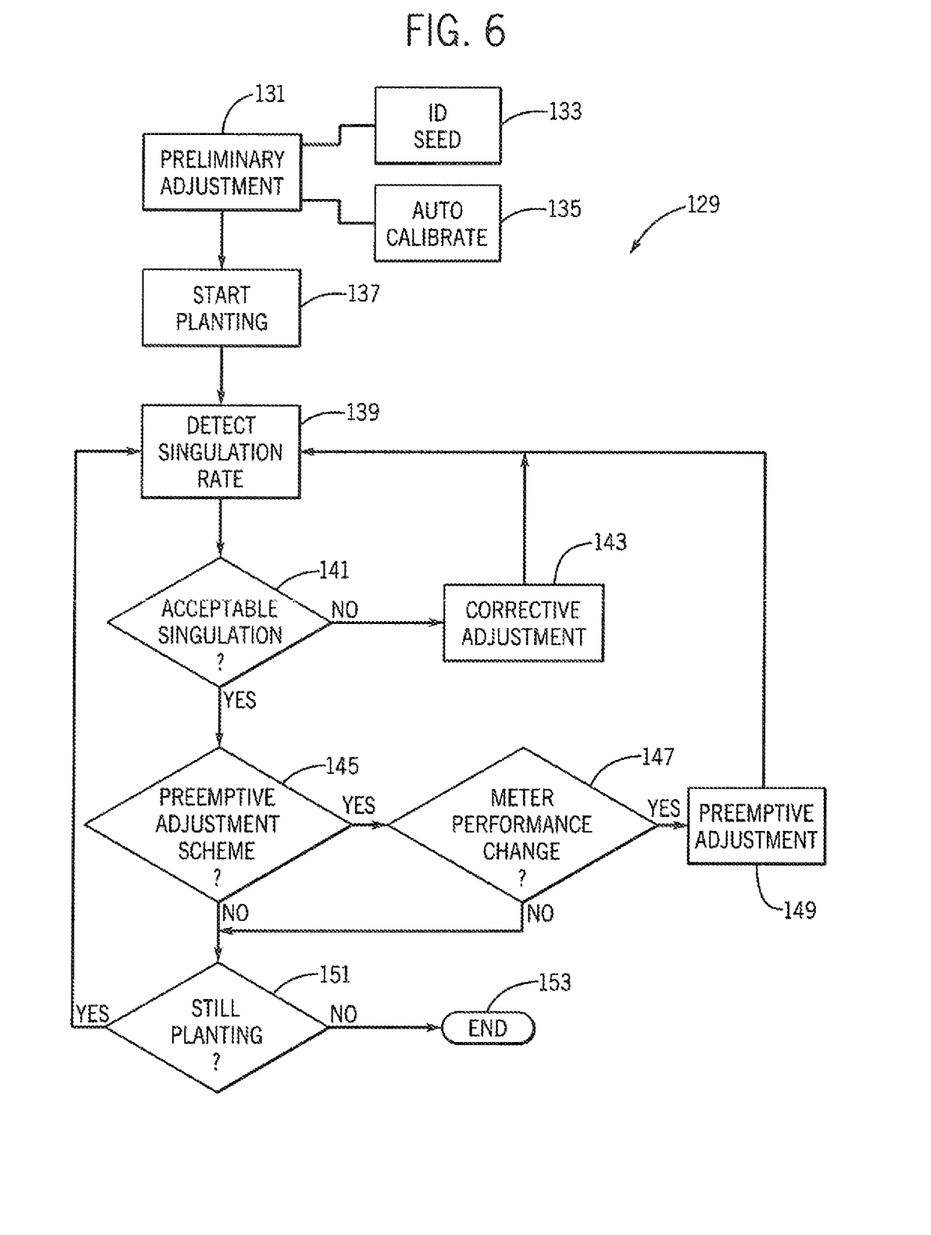
FIG. 6 illustrates a schematic representation of a method for controlling a singulator in accordance with the present invention.

Referring now to FIG. 6 and with further reference to FIGS. 2 and 3, a flowchart of one embodiment of a method for automatically controlling a singulator 53 of a seed meter system 5 by way to control system 55 is shown as represented by numeral 129. As represented at block 131, the control system 55 makes a preliminary adjustment to the singulator 53. This can include adjusting the singulator 53 to an initial base setting. As represented at block 133, making preliminary adjustment to the singulator can include identifying a seed type to be planted with the planter 9 (FIG. 1), which may be done by entering information about the seed type into the interface system 69. The control system 55 determines the initial base setting for the singulator 53 based on the seed type information, such as by referring to a lookup table with stored data relating to initial base settings for different seed types. Block 135 represents an automatic calibration procedure. During automatic calibration, control system 55 moves the seed-removing assembly 71 toward a maximum singulating position nearest the seed pocket movement path 87 to create a purposeful over-singulation condition in which the seed-removing assembly empties all seeds from individual seed pockets. Control system 55 commands priming of the seed meters 6 by rotating the seed disks 41 while applying vacuum to the seed meters 6 for filling the seed pockets 45 with seed. While priming the seed meters 6, the control system 55 adjusts the singulators 53 from the purposeful over-singulation condition to a less aggressive singulating setting. Control system 55 continues adjusting the singulators 53 to less aggressive singulating settings until seed-removing assembly 71 is spaced far enough from the seed pocket movement path 87 to allow seeds to be maintained in the seed pockets 45. When the control system 55 detects that seeds are in the seed pockets 45, the control system 55 stops adjusting the singulator 53 and defines the current setting of the singulator 53 as the initial base setting.

As represented at blocks 137 and 139, planting begins and the control system 55 monitors singulation performance. Monitoring singulation performance can include evaluating signals from singulation sensor 125. As represented at block 141, the control system 55 determines whether the singulation rate is acceptable. From data based on the signals from the singulation sensor 125, control system 55 evaluates whether there is a seed delivery rate discontinuity, such as skips or doubles. This may be done by comparing a current singulation rate to a target singulation rate and identifying any deviation between the current and target singulation rates, either directly or with respect to a threshold deviation rate. As represented at block 143, if the current singulation rate is not the target singulation rate or beyond the threshold of allowable deviation from the target singulation rate, then the control system 55 performs a reactive adjustment by commanding a corrective adjustment to the singulator 53. When skips and corresponding over-singulation are detected, the control system 55 adjusts the singulator 53 to a less aggressive singulating setting. Control system 55 may also adjust the airflow system 25 to vary vacuum pressure within the seed meter(s) 6 that may influence occurrences of skips. Control system 55 can detect skips by identifying longer-than-expected durations between consecutive seeds. When doubles and corresponding under-singulation is detected, the control system 55 adjusts the singulator 53 to a more aggressive singulating setting. Control system 55 can detect doubles by identifying shorter-than-expected durations between consecutive seeds. The control system 55 determines a target-corrected singulator setting corresponding to a target-corrected position for the seed-removing assembly 71 within the meter housing 27 based on the identified deviation of the current singulation rate with respect to the target singulation rate. The control system 55 commands the adjustment drive system 73 to move the seed-removing assembly 71 to the target-corrected position. Control system 55 can determine the target-corrected position as a function of the magnitude of deviation from the current singulation rate to the target singulation rate, whereby the control system 55 defines a target-corrected position that requires relatively further movement of the seed-removing assembly 71 when relatively more skips or doubles are detected. Or, the target-corrected position can be a predetermined constant incremental movement with respect to the current position of the seed-removing assembly 71, such as moving the seed-removing assembly 71 in an increment(s) of 1/32 inch, 1/16 inch, or 1/8 inch for each new target-corrected position. Control system 55 can command the correction adjustments of the singulator 53 by implementing a correction strategy determined based at least in part on the defined seed type. Such correction strategy may include making relatively larger correction adjustments for relatively larger seed types and making relatively smaller correction adjustments for relatively smaller seed types. Regardless, once a corrective adjustment is made, the control system 55 again monitors singulation performance, as represented at block 139.

As represented at blocks 141 and 145, if the singulation rate is acceptable and the seed meter system 5 is implementing a preemptive adjustment scheme, then control system 55 monitors various performance and environmental characteristics of the seed meters 6. As represented at block 147, if the singulation rate is acceptable and the control system 55 detects a change in the seed meter performance characteristic that may negatively influence singulation, then the control system 55 commands a preemptive adjustment to the singulator 53, as represented at block 149. This may include detecting changes in the rotational speed of the seed disk 41 and/or a vacuum pressure inside of the meter housing 27 with the seed meter sensor(s) 127 and/or detecting changes in travel speed of the planter 9 and tractor 11 and thus the seed meter 6 relative to the agricultural field. Upon detecting such meter performance changes, control system 55 commands adjustment of the singulator 53 to a less aggressive singulating setting if the detected meter performance change tends to lead to skips and commands adjustment of the singulator 53 to a more aggressive singulating setting, if the detected meter performance change tends to lead to doubles. After making the preemptive adjustment, the control system 55 again monitors singulation performance as represented at block 139. As represented at blocks 145, 147, 151, if the seed meter system 5 does not implement a preemptive adjustment scheme, or if a preemptive adjustment scheme is implemented and there is no change in meter performance, then the control system 55 evaluates whether the planter 9 is still planting. If planting is still underway, then the control system 55 again monitors singulation performance as represented at block 139. Otherwise, if planting is don; the process ends as represented at block 153.

Many changes and modifications could be made to the invention without departing from the spirit thereof. The scope of these changes will become apparent from the appended claims.

I claim:

1. A method of adjusting seed singulation in a seed meter system of a planter while row-crop planting, the method comprising:
conveying seeds through a seed meter with a seed disk for delivering the seeds onto an agricultural field during a row-crop planting session with a planter;
singulating the seeds during conveyance through the seed meter for individual release out of the seed meter with a singulator;
detecting a current singulator setting of the singulator corresponding to a current position of the singulator inside of the seed meter;
detecting a current singulation rate;
determining a target singulation rate;
identifying a deviation of the current singulation rate with respect to the target singulation rate;
if the deviation occurs, determining a target-corrected singulator setting corresponding to a target-corrected position of the singulator inside of the seed meter based on the identified deviation of the current singulation rate with respect to the target singulation rate; and
adjusting the singulator from the current singulator setting to the target-corrected singulator setting to move the singulator from the current position target-corrected position inside the seed meter
if the deviation fails to occur, executing a preemptive adjustment scheme to monitor performance of the seed meter such that if a negative influence on the singulating of the seeds during conveyance through the seed meter is detected, a preemptive adjustment to the singulator is performed.

2. The method of claim 1 wherein a control system receives signals from each of a singulator setting sensor arranged in the seed meter to detect the current singulator setting and a singulation sensor arranged in the seed meter to detect the current singulation rate and wherein while identifying the deviation of the current singulation rate with respect to the target singulation rate, the control system evaluates data based on the signal from the singulation sensor relative to the target singulation to determine a current deviation value and further comprising comparing the current deviation value to a threshold deviation value to determine whether to adjust the singulator.

3. The method of claim 2 wherein the step of monitoring performance of the seed meter includes monitoring at least one of a rotational speed of the seed disk, a vacuum pressure inside of the meter housing, and a travel speed of the seed meter relative to the agricultural field, detecting a change in the performance characteristic of the seed meter and making the preemptive adjustment to the singulator based on the detected change in the performance characteristic of the seed meter.

4. The method of claim 2 further comprising
defining a seed type for planting with the planter; and
making a preliminary adjustment to the singulators of the seed meters by adjusting the singulators to a preliminary singulator setting based at least in part on the defined seed type.

5. A method of adjusting seed singulation in a seed meter system of a planter while row-crop planting, the method comprising:
defining a seed type for planting with a planter including a seed meter system with seed meters for delivering seeds onto an agricultural field during a planting session, wherein each seed meter includes a seed disk having seed pockets carrying the seeds to a release location in the seed meter for release into a seed tube delivering the seeds onto the field and a singulator configured to remove potential extra seeds from the seed pockets for leaving a single seed in each seed pocket of the seed disk;
making a preliminary adjustment to the singulators of the seed meters for controlling how much mechanical interaction the singulators apply to the seeds in the seed pockets for removing the potential extra seeds from the seed pockets of the seed disks based at least in part on the defined seed type;
monitoring seed delivery rates of the seed meters during the planting session;
identifying a seed meter having a seed delivery rate discontinuity;
making a correction adjustment to the singulator in the seed meter with the identified seed delivery rate discontinuity to change how much mechanical interaction the singulator applies to the seeds in the seed pockets based on the identified seed delivery rate discontinuity; and
if the seed meter fails to have the seed delivery rate discontinuity, executing a preemptive adjustment scheme to monitor performance of the seed meter such that if a negative influence on the singulating of the seeds during conveyance through the seed meter is detected, a preemptive adjustment to the singulator is performed.

6. The method of claim 5 wherein the singulator includes an adjustment drive system and a seed-removing assembly moved by the adjustment drive system and wherein the control system commands the adjustment drive system to move the seed-removing assembly between a maximum singulating position applying a maximum amount of mechanical interaction to the seeds in the seed pockets and a minimum singulating position applying a minimum amount of mechanical interaction to the seeds in the seed pockets.

7. The method of claim 6 wherein the preliminary adjustment to the singulators includes calibrating each singulator by moving the seed-removing assembly from a first position relatively closer to the maximum singulating position creating a purposeful over-singulation condition in which the seed-removing assembly empties all seeds from individual seed pockets toward a second position relatively closer to the minimum singulating position while priming the seed meter by rotating the seed disk for simultaneously lessening the amount of mechanical interaction applied by the seed-removing assembly to the seeds in the seed pockets while priming the seed meter and stopping movement of the seed-removing assembly from the first position to the second position upon detection of seeds in the seed pockets to define a base position of the seed removing assembly.

8. The method of claim 5 wherein, during the preliminary adjustment, a control system commands an adjustment drive system of the singulator to move a seed-removing assembly within the seed meter to a base position corresponding to a predetermined base setting for the defined seed type.

9. The method of claim 8 wherein the seed-removing assembly includes at least one spool and the control system commands movement of the at least one spool relatively nearer to or farther from the seed pockets during the preliminary adjustment until the spool arrives at the base position.

10. The method of claim 9 wherein the seed-removing assembly includes a first spool and a second spool arranged on radial opposite sides of the seed pockets of the seed disk and wherein the control system commands movement of the first and second spools in opposite directions toward each other to move the first and second spools closer to the seed pockets or in opposite directions away from each other to move the first and second spools farther from the seed pockets while moving the first and second spools to the base position.

11. The method of claim 5 wherein the correction adjustment includes implementing a correction strategy determined based at least in part on the defined seed type.

12. The method of claim 11 wherein the correction strategy includes making relatively larger correction adjustments for relatively larger seed types and making relatively smaller correction adjustments for relatively smaller seed types.

13. The method of claim 5 wherein the singulator includes an adjustment drive system arranged for moving a seed-removing assembly and wherein a control system sends a correction adjustment signal to the adjustment drive system commanding movement of the seed-removing assembly during the correction adjustment.

14. The method of claim 13 wherein the adjustment drive system includes a motor, and the correction adjustment signal from the control system commands rotation of an output shaft of the motor in a direction and an angular distance corresponding to performing a correction of at least one of an under-singulation condition of the singulator in which the seed-removing assembly applies too little mechanical interaction to the seeds in the seed pockets allowing more than one seed to be carried in individual seed pockets and an over-singulation condition of the singulator in which the seed-removing assembly applies too much mechanical interaction to the seeds in the seed pockets allowing emptying all seeds from individual seed pockets for attenuating the at least one of the under-singulation condition and over-singulation condition the singulator.

15. The method of claim 13 wherein the adjustment drive system includes a linear actuator and the correction adjustment signal from the control system commands extension or retraction of the linear actuator in a direction and distance corresponding to performing a correction of at least one of an under-singulation condition of the singulator in which the seed-removing assembly applies too little mechanical interaction to the seeds in the seed pockets allowing more than one seed to be carried in individual seed pockets and an over-singulation condition of the singulator in which the seed-removing assembly applies too much mechanical interaction to the seeds in the seed pockets allowing emptying all seeds from individual seed pockets for attenuating the at least one of the under-singulation condition and over-singulation condition the singulator.

16. The method of claim 13 wherein the seed-removing assembly includes at least one spool and the control system commands movement of the at least one spool relatively nearer to or farther from the seed pockets during the correction adjustment until the spool arrives at an adjusted position.

17. The method of claim 16 wherein the at least one spool of the seed-removing assembly includes a first spool and a second spool arranged on radial opposite sides of the seed pockets of the seed disk, and wherein the control system commands movement of the first and second spools in opposite directions toward each other to move the first and second spools closer to the seed pockets to attenuate under-singulation conditions of the singulator or in opposite directions away from each other to move the first and second spools farther from the seed pockets to attenuate over-singulation conditions of the singulator.

18. A seed meter system for dispensing individual seeds while row-crop planting an agricultural field with a planter, the seed meter system comprising:

a housing defining a housing cavity with a seed reservoir receiving seeds in the housing cavity and an outlet for directing seeds out of the housing toward an agricultural field during a planting session;

a seed disk arranged for rotation within the housing cavity and including seed pockets rotating past the seed reservoir and configured to receive seeds from the seed reservoir and carry the seeds toward the outlet of the housing;

a singulator arranged within the housing cavity upstream of the outlet, and wherein the singulator includes, a seed-removing assembly arranged for movement with respect to the seed pockets to apply mechanical interaction to the seeds in the seed pockets for removing excess seeds from the seed pockets;

an adjustment drive system arranged for moving the seed-removing assembly to increase or decrease an amount of mechanical interaction applied by the seed-removing assembly to the seeds in the seed pockets while seeds are directed out of the housing during the planting session; and a control system configured to detect a singulator setting of the singulator corresponding to a position of the seed-removing assembly within the housing and identify a deviation of a seed delivery rate with respect to a target seed delivery rate, wherein:

upon identifying the deviation of the seed delivery rate with respect to the target seed delivery rate, the control system determines a target-corrected singulator setting and moves the seed-removing assembly within the housing cavity by adjusting the singulator to the target-corrected singulator setting; and upon a failure to identify the deviation of the seed delivery rate with respect to the target seed delivery rate, the control system executes a preemptive adjustment scheme to monitor performance of the seed meter such that if a negative influence on the singulating of the seeds during conveyance through the seed meter is detected, a preemptive adjustment to the singulator is performed.

19. The seed meter system of claim 18, further comprising at least one seed sensor arranged downstream of the singulator configured to send a signal to the control system corresponding to a current seed delivery rate and wherein the control system evaluates the signal from the at least one seed sensor to identify an under-singulation condition in which the seed-removing assembly applies too little mechanical interaction to the seeds in the seed pockets allowing more than one seed to be carried in individual seed pockets or an over-singulation condition in which the seed-removing assembly applies too much mechanical interaction to the seeds in the seed pockets allowing emptying all seeds from individual seed pockets and wherein the control system controls the adjustment drive system to move the seed-removing assembly within the housing cavity to attenuate the under-singulation condition or over-singulation condition.

20. The seed meter system of claim 19, wherein the control system is configured to control the adjustment drive system to move the seed-removing assembly to a base position within the housing cavity during preparation for beginning the planting session and move the seed-removing assembly away from the base position during the planting session in response to the identified deviation of the seed delivery rate with respect to a target seed delivery rate.

\* \* \* \* \*